United States Patent
Choi et al.

(10) Patent No.: US 9,919,925 B2
(45) Date of Patent: Mar. 20, 2018

(54) CATALYST OR PRODUCTION OF MULTI-WALLED CARBON NANOTUBES AND METHOD OF PRODUCING MULTI-WALLED CARBON NANOTUBES USING THE SAME

(71) Applicants: SK Innovation Co., Ltd., Seoul (KR); SK Global Chemical Co., Ltd., Seoul (KR)

(72) Inventors: Hyun-Chul Choi, Daejeon (KR); Ok-Youn Kim, Daejeon (KR); Yong-Tak Kwon, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 0 days.

(21) Appl. No.: 15/215,993

(22) Filed: Jul. 21, 2016

(65) Prior Publication Data
US 2017/0022063 A1    Jan. 26, 2017

(30) Foreign Application Priority Data

Jul. 23, 2015 (KR) .................. 10-2015-0104406

(51) Int. Cl.
| | | |
|---|---|---|
| *C01B 31/02* | (2006.01) | |
| *B01J 21/10* | (2006.01) | |
| *B01J 35/00* | (2006.01) | |
| *B01J 23/745* | (2006.01) | |
| *B01J 21/04* | (2006.01) | |
| *B01J 21/14* | (2006.01) | |
| *C01B 32/162* | (2017.01) | |
| *B82Y 40/00* | (2011.01) | |
| *B82Y 30/00* | (2011.01) | |

(52) U.S. Cl.
CPC ......... *C01B 31/0233* (2013.01); *B01J 21/04* (2013.01); *B01J 21/10* (2013.01); *B01J 21/14* (2013.01); *B01J 23/745* (2013.01); *B01J 35/0006* (2013.01); *C01B 32/162* (2017.08); *B82Y 30/00* (2013.01); *B82Y 40/00* (2013.01); *C01B 2202/04* (2013.01); *C01B 2202/06* (2013.01); *C01B 2202/22* (2013.01); *Y10S 977/752* (2013.01); *Y10S 977/843* (2013.01)

(58) Field of Classification Search
CPC ..... C01B 31/0233; B01J 21/10; B01J 23/745; B01J 35/0006
See application file for complete search history.

(56) References Cited

U.S. PATENT DOCUMENTS

| | | | | |
|---|---|---|---|---|
| 2005/0074392 A1* | 4/2005 | Yang | ............ | B82Y 30/00 423/447.3 |
| 2005/0191493 A1* | 9/2005 | Glatkowski | ............ | B82Y 10/00 428/408 |
| 2012/0135858 A1* | 5/2012 | Silvy | ............ | B01J 35/0006 502/177 |
| 2013/0171054 A1 | 7/2013 | Kim et al. | | |
| 2014/0087184 A1 | 3/2014 | Choi et al. | | |

FOREIGN PATENT DOCUMENTS

KR          101303061 B1       9/2013

OTHER PUBLICATIONS

Periodic Table of Elements, NIST SP 966 (Sep. 2003).*
Melezhyk et al., "Multicomponent Catalysts for Synthesis of Carbon Nanotubes by Chemical Vapor Decomposition Method", Transactions TSTU, 2013, pp. 108-120, 19:1.

* cited by examiner

*Primary Examiner* — Daniel McCracken
(74) *Attorney, Agent, or Firm* — The Webb Law Firm

(57) ABSTRACT

Disclosed is a catalyst for production of multi-walled carbon nanotubes, in which the catalyst includes a transition metal catalyst supported on a support mixture including MgO, and thus can increase the production of multi-walled carbon nanotubes and, at the same time, reduce the number of walls of the multi-walled carbon nanotubes to thereby reduce the surface resistance of the multi-walled carbon nanotubes. Also disclosed is a method of producing multi-walled carbon nanotubes using the catalyst. The catalyst for production of multi-walled carbon nanotubes includes: a support mixture of a first support and a second support mixed with the first support; and a transition metal catalyst supported on the support mixture.

2 Claims, 2 Drawing Sheets

CATALYST OR PRODUCTION OF MULTI-WALLED CARBON NANOTUBES AND METHOD OF PRODUCING MULTI-WALLED CARBON NANOTUBES USING THE SAME

CROSS-REFERENCE TO RELATED APPLICATION

This application claims priority to Korean Patent Application No. 10-2015-0104406 filed Jul. 23, 2015, the disclosure of which is hereby incorporated in its entirety by reference.

BACKGROUND

1. Technical Field

The present invention relates to a catalyst for production of multi-walled carbon nanotubes, and more particularly, to a catalyst for production of multi-walled carbon nanotubes, in which the catalyst comprises a transition metal catalyst supported on a support mixture including MgO, and thus can increase the production of multi-walled carbon nanotubes and, at the same time, reduce the number of walls of the multi-walled carbon nanotubes to thereby reduce the surface resistance of the multi-walled carbon nanotubes, and to a method of producing multi-walled carbon nanotubes using the catalyst.

2. Related Art

Carbon nanotubes are large molecules in which hexagonal honeycomb-shaped graphite sheets composed of carbon atoms, each bonded to three other carbon atoms, are rolled into nanosized tubes. These carbon nanotubes have unique physical properties depending on the size or shape.

Carbon nanotubes are generally composed of graphite sheets rolled into a cylindrical shape. Carbon nanotubes can be classified into single-walled carbon nanotubes having one cylindrical graphite sheet, double-walled carbon nanotubes having two cylindrical graphite sheets, and multi-walled carbon nanotubes having three or more cylindrical graphite sheets, and have different properties depending on the number of walls. For example, single-walled or double-walled carbon nanotubes have high electrical properties, and for this reason, are frequently used in device applications such as field emission devices, electronic devices, or sensors, and multi-walled carbon nanotubes have electrical properties inferior to those of single-walled or double-walled carbon nanotubes, but can be used for high-strength composite materials or the like due to their high physical properties.

In order to advantageously apply carbon nanotubes in various fields, a method of synthesizing a large amount of high-purity carbon nanotubes in a cost-effective manner is necessarily required.

In the case of multi-walled carbon nanotubes, there is a problem in that, as the number of walls of multi-walled carbon nanotubes increases, the ratio of disordered graphite increases, resulting in a decrease in the quality of the multi-walled carbon nanotubes. For this reason, efforts have been made to reduce the number of walls of multi-walled carbon nanotubes without reducing the catalytic production of multi-walled carbon nanotubes.

Prior art documents related to the present invention include Korean Patent No. 10-1303061 (published on Sep. 3, 2013) which discloses a catalyst composition for production of multi-walled carbon nanotubes.

SUMMARY

Various embodiments of the present invention are directed to a catalyst for production of multi-walled carbon nanotubes, in which the catalyst comprises a transition metal catalyst supported on a support mixture including MgO, and thus can increase the production of multi-walled carbon nanotubes and, at the same time, reduce the number of walls of the multi-walled carbon nanotubes to thereby reduce the surface resistance of the multi-walled carbon nanotubes, and to a method of producing multi-walled carbon nanotubes using the catalyst.

In an embodiment of the present invention, a catalyst for production of multi-walled carbon nanotubes comprises: a support mixture of a first support and a second support mixed with the first support; and a transition metal catalyst supported on the support mixture.

In another embodiment of the present invention, a method for producing multi-walled carbon nanotubes comprises: (a) preparing a catalyst for production of multi-walled carbon nanotubes; and (b) reacting the catalyst for production of multi-walled carbon nanotubes with hydrocarbon gas and hydrogen gas at a temperature of 600 to 900° C. to form multi-walled carbon nanotubes.

DETAILED DESCRIPTION

Figure 1:
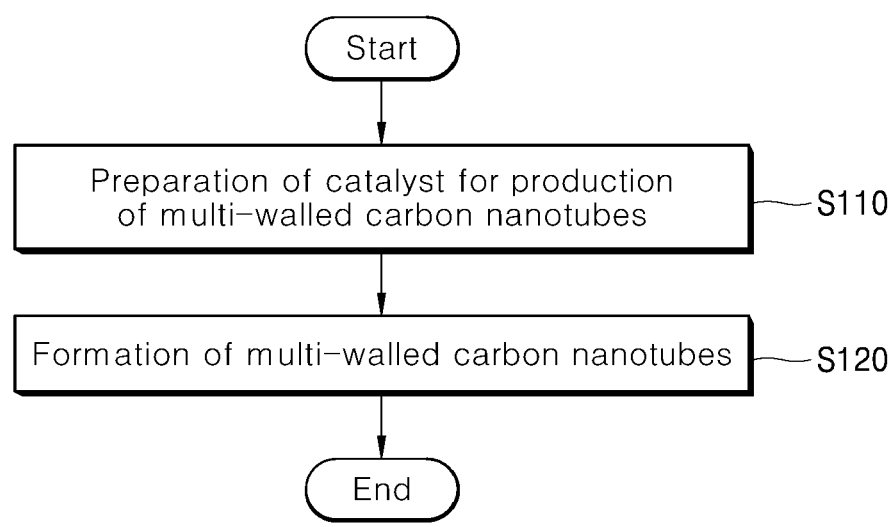
FIG. 1 is a process flow chart showing a method for producing multi-walled carbon nanotubes according to an embodiment of the present invention.

Exemplary embodiments will be described below in more detail with reference to the accompanying drawings. The disclosure may, however, be embodied in different forms and should not be constructed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

Hereinafter, a catalyst for production of multi-walled carbon nanotubes according to a preferred embodiment of the present invention and a method of producing multi-walled carbon nanotubes using the catalyst will be described in detail with reference to the accompanying drawings.

Catalyst for Production of Multi-Walled Carbon Nanotubes

A catalyst for production of multi-walled carbon nanotubes according to the present invention comprises a support mixture and a transition metal catalyst.

The support mixture is composed of a first support and a second support.

The first support may have a solid spherical structure. As used herein, the term "solid spherical structure" refers to a packed spherical shape, including not only a completely spherical shape but also an elliptically spherical shape. The first support that is used in the present invention may be any one of alumina ($Al_2O_3$) and silica ($SiO_2$).

The second support that is used in the present invention is magnesium oxide (MgO). Herein, magnesium oxide (MgO) that is used as the second support is mixed with the first support ($Al_2O_3$) to form an alumina ($Al_2O_3$)-magnesium oxide (MgO)-magnesium aluminate ($MgAl_2O_4$) support mixture. MgO is mixed with the first support to change the acid strength and acid amount of the first support to suppress the production of amorphous carbon, thereby increasing the purity and production of multi-walled carbon nanotubes.

MgO that is used as the second support is preferably added in an amount of 5-50 wt % based on 100 wt % of the catalyst for production of multi-walled carbon nanotubes. If MgO is added in an amount of less than 5 wt % based on 100 wt % of the catalyst for production of multi-walled carbon nanotubes, it cannot change the acidic properties of the first support due to its insufficient amount, and thus cannot properly exhibit the effects of reducing the number of walls of multi-walled carbon nanotubes and increasing the production and purity of multi-walled carbon nanotubes. On the contrary, if MgO is added in an amount of more than 50 wt % based on 100 wt % of the catalyst for production of multi-walled carbon nanotubes, it will have an insignificant effect on a decrease in the number of walls of multi-walled carbon nanotubes, and will rapidly reduce the production of multi-walled carbon nanotubes, and will also reduce the purity of multi-walled carbon nanotubes to reduce the quality of multi-walled carbon nanotubes produced.

The transition metal catalyst is prepared by an impregnation method that is a conventional catalyst preparation method, and the prepared transition metal catalyst is dispersed uniformly inside and outside the support mixture. Herein, the transition metal catalyst comprises at least one transition metal selected from the group consisting of iron (Fe), cobalt (Co), nickel (Ni), yttrium (Y), molybdenum (Mo), copper (Cu), platinum (Pt), palladium (Pd), vanadium (V), niobium (Nb), tungsten (W), chromium (Cr), iridium (Ir) and titanium (Ti). This transition metal catalyst is uniformly adsorbed and dispersed on the surface and inside of the alumina ($Al_2O_3$)-magnesium oxide (MgO)-magnesium aluminate ($MgAl_2O_4$) support mixture.

For example, the transition metal catalyst can be prepared by impregnating a water-soluble transition metal catalyst precursor inside and outside the support mixture by incipient wetness impregnation. As the water-soluble transition metal catalyst precursor, a metal hydrate is used, which may be at least one selected from among iron (III) nitrate hydrate, nickel nitrate hydrate, cobalt nitrate hydrate and the like. Examples of this water-soluble metal catalyst precursor include, in addition to metal nitrate hydrates, any precursors that can be dissolved in solvents such as water, methanol, ethanol or isopropanol.

This transition metal catalyst is preferably added in an amount of 1-20 wt % based on 100 wt % of the catalyst for production of multi-walled carbon nanotubes. If the transition metal catalyst is added in an amount of less than 1 wt % based on the total weight of the catalyst for production of multi-walled carbon nanotubes, it will have a very short life span due to its insignificant amount and will show low productivity, and thus cannot produce high-purity multi-walled carbon nanotubes. On the contrary, if the transition metal catalyst is added in an amount of more than 20 wt % based on the total weight of the catalyst for production of multi-walled carbon nanotubes, it will not be cost-effective, because it can act as a factor of increasing the production cost without further increasing the effect.

Method for Producing Multi-Walled Carbon Nanotubes

FIG. 1 is a process flow chart showing a method for producing multi-walled carbon nanotubes according to an embodiment of the present invention.

Referring to FIG. 1, a method for producing multi-walled carbon nanotubes according to an embodiment of the present invention includes the steps of: (S110) preparing a catalyst for production of multi-walled carbon nanotubes; and (S120) forming multi-walled carbon nanotubes.

In step (S110) of providing a catalyst for production of multi-walled carbon nanotubes, the catalyst for production of multi-walled carbon nanotubes is prepared. This catalyst for production of multi-walled carbon nanotubes can be synthesized using an impregnation method.

Specifically, a Mg precursor is dissolved in a solvent, and boehmite is added to and mixed with the solution for 10-30 minutes. The mixture is dried at a temperature of 100 to 150° C. for 1-3 hours, and then heat-treated at a temperature of 450 to 550° C. for 1-5 hours, thereby preparing a support mixture.

Next, a transition metal catalyst precursor is dissolved in a solvent, and then mixed with the support mixture for 10-30 minutes. Following this, the resulting mixture is dried and heat-treated under the same conditions as described above, thereby forming a catalyst for production of multi-walled carbon nanotubes.

The catalyst preparation method as described above uses a simple preparation process and makes it possible to uniformly load the active material transition metal and Mg that controls the acidic properties of the support.

In step (S120) of forming multi-walled carbon nanotubes, the catalyst for production of multi-walled carbon nanotubes is reacted with hydrocarbon gas and hydrogen gas at a temperature of 600 to 900° C. to form multi-walled carbon nanotubes.

In this step, the hydrocarbon gas may be methane, ethylene, acetylene, LPG, or a mixture thereof, but is not limited thereto, and the hydrocarbon gas is introduced together with the hydrogen gas. Herein, the hydrogen gas serves to activate the active catalyst material metal oxide by a reduction reaction and to eliminate an amorphous carbon intermediate that can occur during the production of carbon nanotubes. Each of such hydrocarbon gas and hydrogen gas is preferably supplied at a flow rate of 50-500 sccm for 5-60 minutes, preferably 10-30 minutes.

In the above-described method for producing multi-walled carbon nanotubes according to the embodiment of the present invention, the transition metal catalyst is supported on the support mixture including MgO, whereby the number of walls of multi-walled carbon nanotubes produced using the catalyst can be reduced while the production of multi-walled carbon nanotubes can be increased.

As a result, multi-walled carbon nanotubes that are produced by the method according to the embodiment of the present invention have a wall number of 5-15 and a surface resistance of 100Ω/□ or lower.

Furthermore, in the method for producing multi-walled carbon nanotubes according to the embodiment of the present invention, the surface resistance of multi-walled carbon nanotubes can be reduced by reducing the number of walls of the multi-walled carbon nanotubes, and the production of the multi-walled carbon nanotubes can also be increased by increasing the purity of the multi-walled carbon nanotubes.

EXAMPLES

Hereinafter, the present invention will be described in further detail with reference to preferred examples. It is to be understood, however, that these examples are for illustrative purposes only and are not intended to limit the scope of the present invention in any way.

Contents that are not disclosed herein can be sufficiently understood by any person skilled in the art, and thus the description thereof is omitted.

1. Production of Multi-Walled Carbon Nanotubes

Table 1 below shows the composition of a catalyst for production of multi-walled carbon nanotubes, prepared in each of Example 1 and Comparative Example 1.

TABLE 1

(unit: wt %)

|  | $Al_2O_3$ | MgO | Fe |
|---|---|---|---|
| Example 1 | 65 | 25.9 | 9.1 |
| Comparative Example 1 | 90.5 | — | 9.5 |

Example 1

42 g of $Mg(NO_3)_2 \cdot 6H_2O$ was dissolved in 25 ml of water, and then 10 g of boehmite was added to the aqueous solution, followed by stirring for 30 minutes. After stirring, the mixture was dried at 120° C. for 3 hours and heat-treated at 500° C. for 3 hours, thereby preparing an $Al_2O_3$—MgO—$MgAl_2O_4$ support mixture.

Next, 18 g of $Fe(NO_3)_3 \cdot 9H_2O$ was dissolved in 9 ml of water, and then the support mixture was added thereto, followed by stirring for 30 minutes. After stirring, the resulting mixture was dried and heat-treated under the same conditions as described above, thereby preparing a catalyst for production of multi-walled carbon nanotubes.

Next, 0.2 g of the catalyst for production of multi-walled carbon nanotubes was placed in a fluidized-bed synthesis system, and 225 sccm of $C_2H_4$ gas and 75 sccm of $H_2$ gas were supplied to the synthesis system and reacted with the catalyst at 700° C. for 20 minutes, thereby producing multi-walled carbon nanotubes.

Comparative Example 1

10 g of boehmite was heat-treated at 500° C. for 3 hours to prepare an $Al_2O_3$ support.

Then, 14 g of $Fe(NO_3)_3 \cdot 9H_2O$ was dissolved in 7 ml of water, and the support was added to the solution, followed by stirring for 30 minutes. After stirring, the resulting mixture was dried and heat-treated in the same manner as described in Example 1, thereby preparing a catalyst for production of multi-walled carbon nanotubes.

Next, 0.2 g of the catalyst for production of multi-walled carbon nanotubes was placed in a fluidized-bed synthesis system, and 225 sccm of $C_2H_4$ gas and 75 sccm of $H_2$ gas were supplied to the synthesis system and reacted with the catalyst at 700° C. for 20 minutes, thereby producing multi-walled carbon nanotubes.

2. Evaluation of Physical Properties

Figure 2:
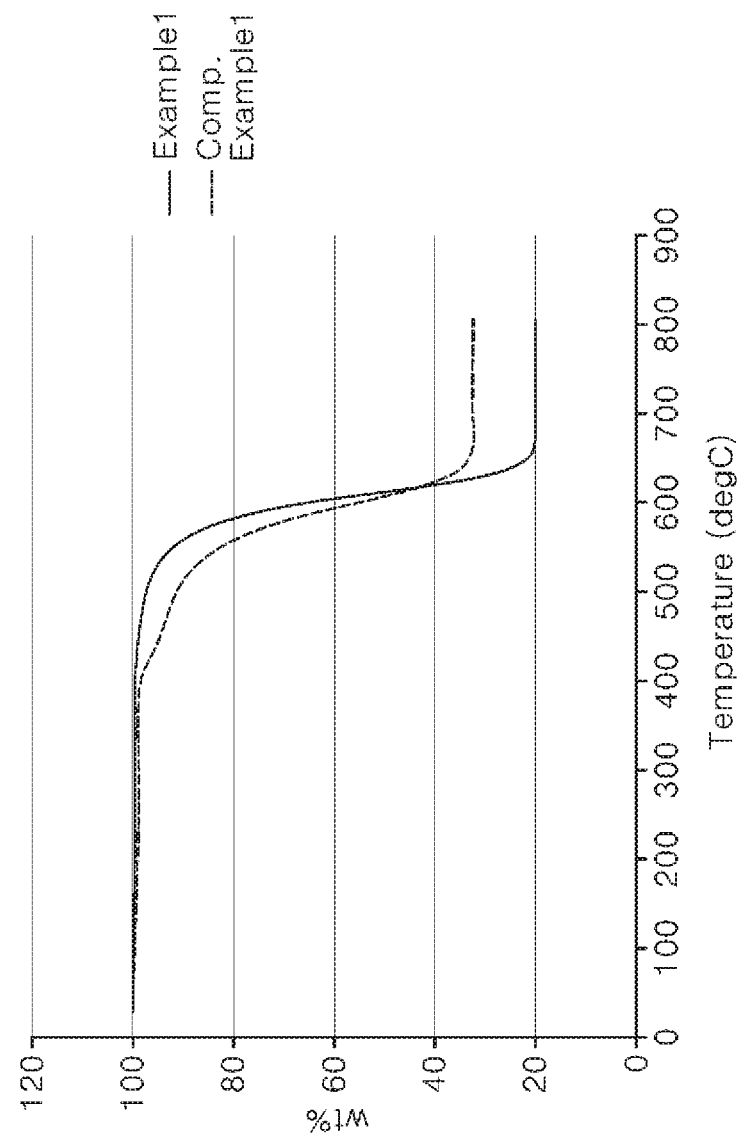
FIG. 2 is a graph showing the results of thermogravimetric analysis (TGA) of multi-walled carbon nanotubes produced in each of Example 1 and Comparative Example 1.

Table 2 below shows the results of evaluating the physical properties of the multi-walled carbon nanotubes produced in each of Example 1 and Comparative Example 1. Furthermore, FIG. 2 is a graph showing the results of thermogravimetric analysis (TGA) of the multi-walled carbon nanotubes produced in each of Example 1 and Comparative Example 1, in which the TGA analysis was performed at a heating rate of 10° C./min and an air flow rate of 200 sccm.

1) Measurement of Surface Resistance 1 mg of carbon nanotube powder was added to 10 g of 2 wt % sodium dodecyl sulfate aqueous solution and dispersed using a tip sonicator for 5 minutes. Then, the dispersion was filtered through filter paper (pore size: 0.2 μm, and diameter: 25 mm) in a filter device to prepare buckypaper. The prepared buckypaper was dried at room temperature for 24 hours, and then the surface resistances at five points (top, bottom, left, right and center) of the buckypaper were measured using a portable 4-point probe test meter (Model HM21, Jandel Inc.), and then averaged.

TABLE 2

|  | Purity (wt %) | Production (g MWCNT/g Cat.) | Number of walls | Surface resistance ($\Omega/\square$) |
|---|---|---|---|---|
| Example 1 | 80 | 4 | 10 | $7 \times 10^1$ |
| Comparative Example 1 | 68 | 2 | 15 | $3 \times 10^2$ |

As can be seen in Tables 1 and 2 above and FIG. 2, the purity and production of the carbon nanotubes produced in Example 1 greatly increased compared to those produced in Comparative Example 1, the number of walls of the carbon nanotubes produced in Example 1 significantly decreased.

In particular, the production of the carbon nanotubes produced in Example 1 increased two times that of Comparative Example 1, and as shown in FIG. 2, amorphous carbon (a region showing the decrease in weight caused by combustion at a temperature of 400 to 500° C.) observed in Comparative Example 1 was not substantially observed in Example 1.

In addition, it could be seen that the carbon nanotubes produced in Example 1 showed a surface resistance value of $7 \times 10^1$ $\Omega/\square$, which is significantly lower than the surface resistance value of the carbon nanotubes produced in Comparative Example 1 ($3 \times 10^2$ $\Omega/\square$).

Based on the above experimental results, it was found that the number of walls of the multi-walled carbon nanotubes produced in Example 1 was reduced to reduce the surface resistance while the purity and production of the carbon nanotubes were increased.

As described above, in the catalyst for production of multi-walled carbon nanotubes according to the present invention and the method of producing multi-walled carbon nanotubes using the catalyst, the transition metal catalyst is supported on the carrier mixture including MgO, whereby the number of walls of multi-walled carbon nanotubes produced using the catalyst can be reduced while the production of the multi-walled carbon nanotubes can be increased.

Accordingly, in the catalyst for production of multi-walled carbon nanotubes according to the present invention and the method of producing multi-walled carbon nanotubes using the catalyst, the surface resistance of multi-walled carbon nanotubes can be reduced by reducing the number of walls of the multi-walled carbon nanotubes, and the production of multi-walled carbon nanotubes can also be increased by increasing the purity of the multi-walled carbon nanotubes.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for producing multi-walled carbon nanotubes, comprising:
   (a) preparing a catalyst for production of multi-walled carbon nanotubes comprising a support mixture of a first support and a second support mixed with the first support and a transition metal catalyst supported on the support mixture, wherein the second support is magnesium oxide (MgO) and the second support is added in an amount of 5-50 wt % based on 100 wt % of the catalyst for production of multi-walled carbon nanotubes; and
   (b) reacting the catalyst for production of multi-walled carbon nanotubes with hydrocarbon gas and hydrogen gas at a temperature of 600 to 900° C. to form multi-walled carbon nanotubes,
   wherein step (a) comprises:
   preparing a mixture by dissolving a Mg precursor in a solvent, adding a boehmite to the solvent containing the dissolved Mg precursor, and mixing the boehmite with the solvent for 10-30 minutes;
   preparing a support mixture by drying the prepared mixture at a temperature of 100 to 150° C. for 1-3 hours, and then heat-treating at a temperature of 450 to 550° C. for 1-5 hours;
   dissolving a transition metal catalyst precursor in a solvent; and
   mixing the solvent containing the dissolved transition metal catalyst precursor with the support mixture for 10-30 minutes.

2. The method of claim 1, wherein the hydrocarbon gas and the hydrogen gas are supplied at a flow rate of 50-500 sccm for 5-60 minutes.

\* \* \* \* \*

UNITED STATES PATENT AND TRADEMARK OFFICE
CERTIFICATE OF CORRECTION

PATENT NO. : 9,919,925 B2  
APPLICATION NO. : 15/215993  
DATED : March 20, 2018  
INVENTOR(S) : Hyun-Chul Choi et al.

Page 1 of 1

It is certified that error appears in the above-identified patent and that said Letters Patent is hereby corrected as shown below:

On the Title Page

Item (54) and in the Specification, Column 1, Line 1, Title, delete "OR" and insert -- FOR --

Signed and Sealed this  
Fifth Day of June, 2018

Andrei Iancu  
*Director of the United States Patent and Trademark Office*